United States Patent [19]

Wade et al.

[11] 4,111,762

[45] Sep. 5, 1978

[54] OPTICALLY BLACK COATING AND PROCESS FOR FORMING IT

[75] Inventors: Jackie F. Wade, Littleton; John E. Peyton, Arvada; Bruce R. Klitzky; Roy E. Groff, both of Denver, all of Colo.

[73] Assignee: Martin Marietta Corporation, Bethesda, Md.

[21] Appl. No.: 758,951

[22] Filed: Jan. 13, 1977

Related U.S. Application Data

[63] Continuation of Ser. No. 545,920, Jan. 31, 1975, abandoned, which is a continuation-in-part of Ser. No. 309,880, Nov. 27, 1972, abandoned.

[51] Int. Cl.$^2$ ............... C25D 11/08; C25D 11/18; C25D 11/24
[52] U.S. Cl. ............................ 204/33; 204/29; 204/35 N; 204/58
[58] Field of Search ............... 204/58, 35 N, 33, 29

[56] References Cited

U.S. PATENT DOCUMENTS

| 3,488,103 | 1/1970 | Webb | 350/58 |
| 3,891,516 | 6/1975 | Chu | 204/33 |

OTHER PUBLICATIONS

Handbook of Chem. & Physics, 32nd Ed., p. 1729.
Surface Treatment of Al by Wernick et al., 3rd Ed., 1964, pp. 52–53, 347.
Objectives in Corrosion Protection of Bright Decorative Trim & Their Implementation", 48th Annual Tech. Proceedings A.E.S., 1961, p. 126.
Electroplating Engineering H. Book, 2nd Ed., A. K. Graham et al., 1962, pp. 437–438.

Primary Examiner—R. L. Andrews

[57] ABSTRACT

A product capable of extremely high absorption of electromagnetic radiation, including visible light, useful in optical applications and as a decorative panel comprises a body made of anodizable metal, preferably aluminum having a roughened surface over which an oxide layer is deposited by anodization. The anodized surface is characterized by a roughened surface of pronounced peaks and valleys and a columnar, fault-ridden structure of the anodized oxide layer itself.

The product is made by honing the anodizable metal surface by impacting it with aluminum oxide particles, preferably of 100 to 200 mesh size, to form peaks and valleys thereon. After honing, the surface is anodized under controlled conditions to develop the oxide layer thereover. After anodizing, the surface may be dyed and sealed. A vacuum drying and hydrogen fluoride treatment step to dry and "water-proof" the surface may be utilized to eliminate reflectance peak values at certain wavelengths.

When dyed black, more than 98% of the impinging radiation of the vast majority of wavelengths of up to 120 microns is absorbed and dissipated by the surface. More than 98% of infrared radiation (above about 7.8 microns wavelength) is absorbed and dissipated by the undyed surface.

22 Claims, 12 Drawing Figures

OPTICALLY BLACK COATING AND PROCESS FOR FORMING IT

This is a continuation of application Ser. No. 545,920 filed Jan. 31, 1975, now abandoned which was in turn a continuation-in-part of application Ser. No. 309,880 filed on Nov. 27, 1972, now abandoned, also entitled "OPTICALLY BLACK COATING".

The present invention relates to a metal body having a surface which has the property of extremely low electromagnetic radiation reflectance therefrom, at least for wavelengths up to about 120 microns. The invention also relates to a method of manufacturing such a body. A metal body having a surface finish in accordance with the present invention is extremely useful in optical applications wherein it is sought to minimize the reflectance of light or electromagnetic radiation in general from the surface thereof. Surfaces prepared in accordance with the invention are also useful in providing decorative, non-reflective surfaces.

There has been much development work in the area of providing and developing metal bodies having a surface finish such that they absorb an extremely high percentage of ultra-violet visible and infrared radiation, and therefore only a very low percentage of such radiation is reflected therefrom. Certain coatings have been developed which are well known and used to provide bodies with such surface finishes. The most well known of such coatings is the 3M Nextel black velvet coating or paint which has a composition by weight of approximately 16% pigment and 84% vehicle, the pigment comprising approximately 20% black carbon and approximately 80% silicon dioxide. This material is commonly used for coatings in optical instruments such as telescope tubes, camera housings, vacuum chamber walls, etc.

In addition to the 3M Nextel black velvet paint, another well known high absorbent of visible and infrared radiation is Parson's black. Parson's black consists of a powdery material which is adhered to the surface of a body to give that surface a high radiation absorption capability. Parson's black is, in general, a better visible and infrared absorbent than 3M Nextel black velvet paint.

Other optically black coatings have been developed, but none which, to applicant's knowledge, achieves the high degree of absorbency of visible and infrared radiation as does the 3M Nextel black velvet paint and Parson's black.

The 3M Nextel black velvet paint and Parson's black, both of which, as noted above, are known for their high absorption capability of visible and infrared radiation, have a substantial shortcoming in their lack of durability. The 3M black velvet paint is subject to chipping and outgassing, both of which detrimentally affect the desirability of the product. Parson's black, being a powdery-like substance, also lacks durability, being very easily removed from any surface on which it is applied.

The present invention provides a metal part having a surface which is very highly absorbent for near ultra-violet, visible and infrared radiation and in many respects is a better radiation absorbent in the visible and infrared wavelengths than either Parson's black or 3M black velvet coating. In addition, the present invention provides a relatively durable surface layer, since it is not subject to the hydrocarbon outgassing or chipping which occurs with 3M black velvet paint, and is not powdery like Parson's black. Moreover, the surface layer has satisfactorily withstood vibration, thermal and shock tests, although it is sensitive to rubbing as by hand, brush or cloth. The material having the surface finish embodying the present invention is extremely well suited for a wide variety of uses where a high absorbency of visible and infrared radiation is desired, and particularly in optical instruments, such as telescope tubes, camera housings, vacuum chamber walls, etc.

In accordance with the present invention, there is provided an anodizable metal surface which has been honed by bombardment with grit particles under pressure to pit the surface to form a plurality of peaks and valleys thereon. The pitted surface is then anodized to develop an oxide coating thereover. The anodization is carried out under conditions such that the oxide layer deposited has a columnar structure containing numerous faults therein. The oxide layer deposited on the peaks is thicker than that deposited in the valleys, whereby the relative height of the peaks over the valleys is increased. The oxide surface may be dyed with a suitable color dye, preferably black, to enhance its visible absorption characteristics.

In accordance with another aspect of the invention, the anodized surface is subjected to vacuum heating and hydrogen fluoride treatment to remove water and any other hydroxyl radical-containing compounds from the oxide layer and to render the layer resistant to re-penetration by water or hydroxyl radicals. Such treatment eliminates reflectance value peaks otherwise encountered in certain wavelength ranges.

In accordance with one aspect of the invention, the metal surface is vapor honed by bombardment with grit, preferably an alumina grit, of a particle size not greater than about 200 mesh,* delivered under air pressure appropriate for the hardness of the particular metal being treated and then anodized by immersing the metal in an acid solution, preferably sulfuric acid, under conditions to form on the surface an oxide layer. The anodization is carried out by using a sulfuric acid solution having a specific gravity of between about 1.10 to 1.13 measured at 70° F.; maintaining the sulfuric acid during anodization at a temperature of between about 80° to 100° F.; using an anodization voltage of between about 12 to 25 volts, and carrying out anodization for a period of from between about 1½ to about 2½ hours. The foregoing minimum time period of 1½ hours for anodization is required only if the oxide layer is to be dyed. In such cases, the oxide layer must be thick enough to provide impregnation sites for a sufficient amount of dye to help in providing visible light absorption. However, if the oxide coating is not to be dyed, an anodization time of as little as ½ hour will suffice to provide desired electromagnetic absorption properties of the surface. (For example, the undyed surface in accordance with the invention is a superior absorbent of infrared radiation). Accordingly, in cases where the oxide layer is not to be dyed, the anodization period required is between about ½ hour to about 2½, preferably 2½, hours.

*Alternative Sieve Designation, ASTM Standard Specification for wire cloth sieves for Testing Purposes.

Sulfuric acid anodization outside the ranges specified in the foregoing paragraph results in a significant deterioration in the electromagnetic absorption characteristics of the anodized surface.

In a preferred mode of operation, anodization is carried out using a sulfuric acid solution having a specific gravity of between about 1.102 and 1.128 and for a period of time from between about 1¾ to about 2¼ hours, with the other conditions being as specified above. The best known mode of carrying out the invention includes anodizing aluminum or an aluminum alloy, the surface of which has been roughened by blasting by an alumina grit of a mesh size between 100 and 200 mesh, in a sulfuric acid solution of a specific gravity of 1.120 (all specific gravities referred to herein are measured at 70° F.) at a voltage of 19 volts for a period of 2 hours. The anodizing solution is preferably saturated with carbon dioxide.

Any anodizable metal such as aluminum or beryllium is believed to be utilizable in accordance with the invention. The metal employed is preferably aluminum since beryllium is poisonous, and hazardous conditions are created by machining and otherwise working it. The term "aluminum", as used in this specification and claims, includes all the usual alloys of aluminum produced in various grades for different uses including, without limitation, the 2000, 5000, 6000 and 7000 series alloys. Among the aluminum alloys used have been alloys 2012, 2024, 6061 and 7075. The actual thickness of the coating deposited by operation in accordance with the invention varies somewhat with the hardness of the metal. On an aluminum alloy such as 6061 an oxide layer of 5 to 10 thousandths of an inch thickness has been obtained. On a harder alloy, an oxide layer of 2 to 3 thousandths of an inch has been obtained. The 2 or 3 thousandths of an inch thickness is sufficient to provide the electromagnetic radiation absorption properties described herein.

When the metal is aluminum, an air pressure of between about 80 to 150 psi, preferably about 120 psi, and a water delivery rate of about 25 to 35 gallons per minute is preferred. The air under pressure is used to direct a slurry of the grit particles in water against the metal workpiece.

After the vapor honing operation, the material is preferably cleaned with a suitable liquid such as a caustic etch solution, thoroughly rinsed, further cleaned with a smut removing chemical, and then rinsed again. Once the process has begun, the surface to be treated in accordance with the invention should not be touched or smudged during the treatment.

The surface provided in accordance with one aspect of the present invention is an anodized aluminum surface which has a plurality of peaks and valleys formed thereon and which is an extremely efficient absorbent of near ultra-violet, visible and infrared radiation. (It should be noted that the term "peaks" is used herein as above to described the physical configuration of the roughened, vapor honed surface as "peaks and valleys." This is not to be confused with the term "peaks" used herein to refer to reflectance value "peaks" or maximas on a graph of reflectance values versus wavelength. The context is believed to make the intended meaning clear in each case). Light absorbency of a surface provided in accordance with the invention is generally, in the tested wavelength range of up to 30 microns, substantially better than that provided by 3M black velvet paint, and to a lesser degree is better than that provided by Parson's black. The light absorbing surface provided by the present invention is also more durable and has a greater shelf life than that provided by either the Parson's black or the 3M black velvet paint, and is not subject to chipping or outgassing.

A body having the high electromagnetic wave absorbent capability surface layer embodied in the present invention is manufactured by a novel process. The process of the invention begins by providing a piece of metal such as aluminum or other equivalent material. In general, the piece of metal is vapor honed by directing aluminum oxide grit under pressure against the surface. The grit is preferably about 100 to 200 mesh size. As a result of the vapor honing, a plurality of peaks and valleys is formed on the surface. A layer of oxide is then formed upon the roughened surface of the body by anodization carried out as described above. After removal from the anodic solution, the body is rinsed, may be dyed and sealed.

If the body is to be dyed, it is immersed in a dye solution to dye the oxide coating a selected color, preferably black. The dye may be of any color; for purposes of providing a decorative panel a color such as gold, red, green or blue may be selected. Tests have indicated that even such colors have the property of extremely high light absorption for certain ranges of wavelengths, even in the visible range. For example, red dyed surfaces have been found to absorb light better than do black dyed surfaces in the range of wavelengths between 0.45 and 0.55 microns. In fact, red, green and blue dyed panels have been found to have a fractional reflectance of less than 0.007 for wavelengths of 0.52 to 0.55 microns. Sealing is carried out in order to "seal" the dye molecules within the oxide layer, as is well known in the art. Conventionally, the sealing is carried out by dipping the dyed oxide layer into boiling water. In accordance with one aspect of the invention, it has been found that in order to preserve the extraordinary light absorption properties obtained in accordance with the invention, the temperature at which the sealing step is carried out should be limited. The temperature at which the sealing step is carried out should not be greater than about 200° F. In order to stablize the dye against washing out the sealing temperature should probably be not less than about 180° F. Accordingly, the preferred range of temperature of the water in which the sealing is carried out is 180° F. to 200° F., more preferably, 185° F. to 195° F. A preferred sealing temperature is 190° F. Sealing is carried out by immersing the body to be sealed in heated water for a period of about 2 minutes. An excessively high temperature of sealing, or an unduly long residence time in the sealing bath, will adversely effect the structure of the oxide layer and tend to diminish the absorption characteristics of the surface of the invention.

In testing light absorbent surfaces prepared in accordance with the invention, maximas of reflectance values are detected at certain wavelengths. It has been found, in accordance with another aspect of the invention, that certain reflectance value maximas or peaks can be eliminated by a vacuum drying and hydrogen fluoride treatment step to remove water and other hydroxyl containing compounds from the oxide layer and to stablize the layer against re-entry of water or other hydroxyl groups. In accordance with this aspect of the invention, the vacuum drying and treatment is accomplished by heating the anodization oxide surface, preferably to a temperature of between about 105° to 110° C. under a vacuum, preferably a vacuum of about 1 millimeter of mercury (mm Hg) pressure in order to drive the trapped water molecules and other hydroxyl group compounds out of the oxide layer. After such drying and while maintaining the article under vacuum a dry hydrogen fluoride (HF) gas is introduced into the vacuum chamber, preferably in amounts to provide an atmosphere over the article in the chamber of about 50 mm Hg pressure. The hydrogen fluoride atmosphere at the stated pressure is maintained for approximately 4½ hours after which time the article is removed from the chamber and the treatment is completed.

In accordance with one aspect of the invention, the vacuum drying and hydrogen fluoride (VDHF) treatment step is carried out after the dyeing and sealing steps are completed.

For a black dyed surface prepared in accordance with the invention but without the VDHF treatment step, reflectance peaks are noted at wavelengths of about 1.3 microns (25% reflectance) and 5.8 microns (11% reflectance). These are eliminated by the VDHF treatment step leaving only one lower peak. Accordingly, a black dyed surface in accordance with the invention is provided which, when the VDHF treatment step is included, provides a surface having only one significant reflectance peak (above 2% reflectance) in the wavelength range of from about 0.27 to 30 microns. This reflectance peak (5% reflectance) occurs at a wavelength of about 4.8 microns.

Further advantages and features of the present invention will be apparent to those skilled in the art to which it relates from the following detailed description thereof made with reference to the accompanying drawings in which.

As noted hereinabove, the present invention provides a material having a unique surface finish and particularly provides a body made of aluminum or the equivalent having a surface finish which gives the body the property of extremely low percentage of reflectance therefrom of electromagnetic radiation in the near ultraviolet to infrared wavelength range. This makes the body particularly useful as a decorative panel.

Figure 2:
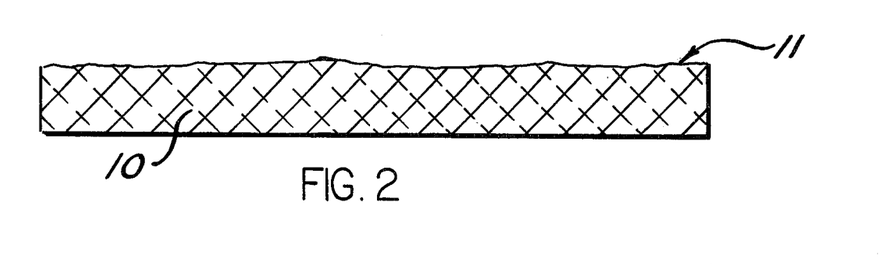
FIGS. 2–5 are schematic sectional views on an enlarged scale through a body at different stages in the process represented by FIG. 1.

Referring to FIG. 2, a surface in accordance with the present invention may be provided on a body of material 10, preferably aluminum. The material 10 may be of any conventional alloy material and has a surface 11 thereon which is to be treated to provide the property of high electromagnetic radiation absorbency. The surface 11, while generally planar, has undulations therein which are illustrated in an exaggerated manner in FIG. 2.

Initially, the material 10 whose surface 11 is to be treated is cut to the required size and shape and an appropriate fixture is provided to hold the piece during the further processing thereof. Any suitable fixture may be used and such need not be shown or described in detail. After the piece 10 has been so fixtured, it is degreased to remove all stains, smudges, grease or oil therefrom. This cleaning is done in accordance with a normal industrial cleaning process, such as EPS 50036. The piece 10 is dried thoroughly and inspected for cleanliness and the cleaning cycle is repeated, if necessary. The steps of fixturing the aluminum part and the cleaning thereof are represented in the flow diagram of FIG. 1 as blocks 14 and 15.

Figure 1:
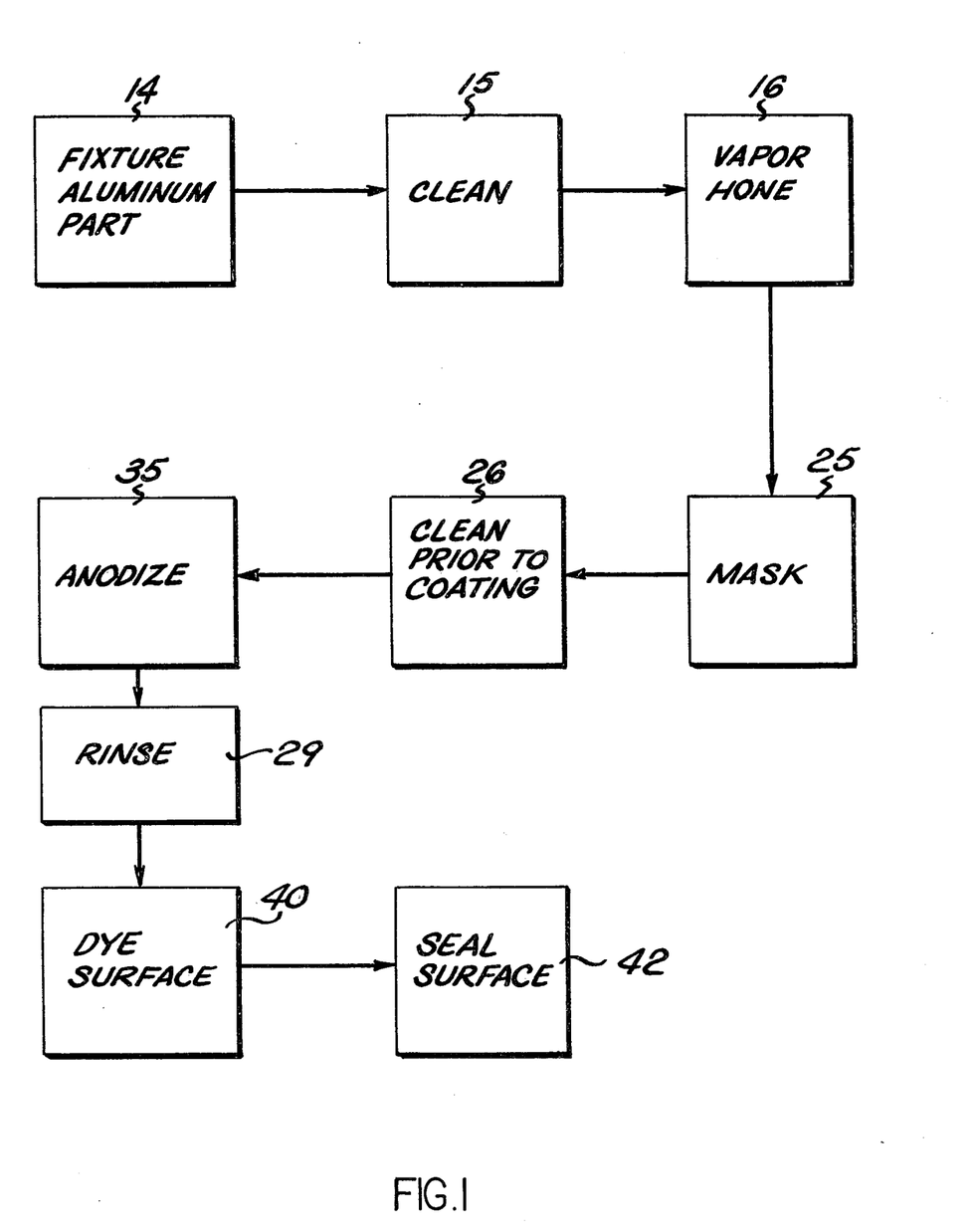
FIG. 1 is a flow diagram illustrating schematically the various steps in the process of manufacture of a body embodying the present invention.
Figure 3:
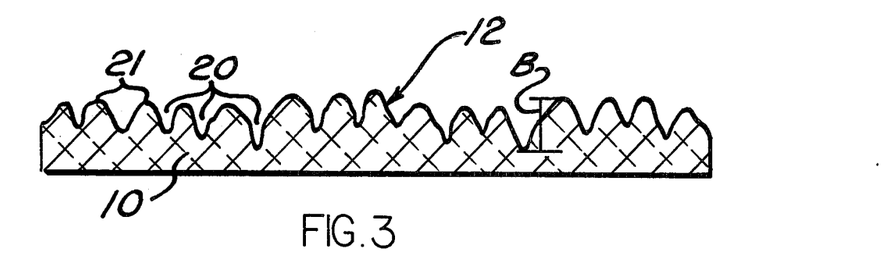

After the piece 10 has been fixtured and cleaned, it is vapor honed as indicated by the block 16 in the flow diagram of FIG. 1. The vapor honing is an extremely important step in the process and involves the forcing of grit, preferably aluminum oxide (alumina) particles, against surface 11. Aluminum oxide grit of from about 100 to 200 mesh size has been found suitable and it is satisfactory, particularly for the vapor honing of aluminum pieces, to force the grit in a slurry with water against the surface to be treated at approximately 120 pounds per square inch of air pressure and a water rate of 30 gallons per minute. Generally, the air pressure and water rate will be varied to suit the metal surface being treated. An air pressure of between about 80 to about 150 pounds per square inch and a water rate of about 25 to 35 gallons per minute is generally satisfactory for aluminum and its various alloys. The honing process pits the surface of the metal which is subjected thereto and forms a plurality of peaks and valleys in the surface thereof. This prepares the metal surface such as the aluminum surface for subsequent treatment and provides a surface on which millions of tiny light traps will be formed as described hereinbelow. FIG. 3, shows the surface 12 formed on the former surface 11 of the piece 10 after the vapor honing. The surface 12 is seen to be substantially roughened as compared to the surface 11, having a plurality of peaks 21 and valleys 20 formed therein. Peaks 21 and valleys 20 are greatly exaggerated in the drawing of FIG. 3 for clarity. The valleys 20 are generally of a V or conical shaped configuration, that is, they have a dimension which decreases as the valley extends deeper into the body of the piece 10. The peaks 21 are generally rounded.

After the vapor honing operation, the piece 10 is rinsed in clear running water for approximately 5 minutes and dried thoroughly. The piece must not be touched by hand after the vapor honing operation to preclude smudging or staining the surface. If a particular pattern of the surface in accordance with the invention is to be applied to the roughened surface 12, then a masking step can be carried out prior to the cleaning step and, in fact, all areas not to be provided with the surface of the invention should be masked off at this point. Any suitable masking material may be utilized, such as an acid-resistant tape. The masking process must be done carefully so as not to soil the surface which is to be provided with the non-reflecting layer. After the masking operation, designated by block 25 in FIG. 1, the cleaning for the next step takes place, as indicated by the block 26 in FIG. 1.

The cleaning of the masked piece in preparation for the anodizing if performed by a caustic etch with a suitable etching solution (well known in the art) and a thorough water rinse. Any alumina grit which impregnates or lodges in the body is dissolved during the etching step. After the rinsing of the material, a cleaning of the surface with a suitable smut-removing chemical (also well known in the art) and an additional rinse is desirable. This cleaning step removes all foreign matter on the surface and the final rinse should be with distilled water. The piece 10 which is being treated should not be allowed to dry during the process as this could seriously impair the anodized layer which is to be immediately applied. An inspection should be made for complete cleanliness, and the cleaning should be repeated, if necessary.

After the cleaning indicated by block 26, the piece is treated by an anodizing process, as indicated by block 35 in FIG. 1. A preferred treating solution is an anodic solution at a temperature of approximately 70° F. and having a specific gravity of 1.102 to 1.128 at 70° F. The solution should be saturated with $CO_2$ by the use of dry ice.

Preferably, the anodizing solution is a solution of sulfuric acid having a specific gravity of from about to 1.102 to 1.128 at 70° F. This corresponds to a solution of about 13% to 17.5% sulfuric acid in water by weight. A preferred solution is one of sulfuric acid in deionized water. Carbon dioxide saturation may be attained by bubbling gaseous carbon dioxide into the aforesaid solution or by depositing pieces of dry ice therein.

The piece to be coated is submerged in the anodizing solution. The fixture or rod to which the piece is attached should be connected to the anode which is connected to a copper bar which extends across the tank contianing the solution. The cathode negative can be attached to the tank lining. After the piece is secured, both mechanically and electrically, in the tank voltage is applied slowly until approximately 18 to 25 volts is reached. The material is then kept in the solution at 18-25 volts for a period of from approximately $1\frac{3}{4}$ to $2\frac{1}{4}$ hours, preferably for about 2 hours. The piece is then removed from the tank and rinsed immediately in tap water for approximately 3 minutes, as indicated by block 29 in FIG. 1.

Figure 4:
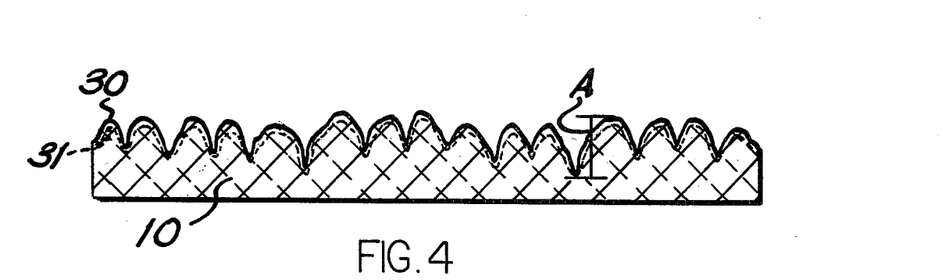

The anodizing step results in the formation of an oxide layer on the surface 12, which layer builds-up the peaks 21 created by the honing step. As shown in FIG. 4, the piece 10 now has the anodic or oxide layer 30 formed over surface 12, as indicated by the dotted line 31 thereon. However, the thickness of the layer 30 applied to the peaks 21 is greater than that applied to the valleys 20. Accordingly, there is a build-up by layer 30 on the peaks 21 which is greater than the build-up on the valleys 20. As a result, there is an increase in the size of the peaks 20 such that the distance that the peaks 20 extend above the valleys 21 increases. This distance is designated A in FIG. 4 and is greater distance than the corresponding measurement B in FIG. 3, prior to deposition of the oxide layer 30.

The piece 10, after the anodizing step is performed, may be dyed to the desired color, either black (preferred for over-all lowest visible light reflectance) or another color for decorative effect or minimum reflectance in certain wavelength ranges. Generally, if it is desired to provide the highly effective optical properties having the high absorbent capability in both the visible and infrared wavelengths, the piece 10 is dyed black in the dyeing step, which is indicated by block 40 in FIG. 1.

Figure 5:
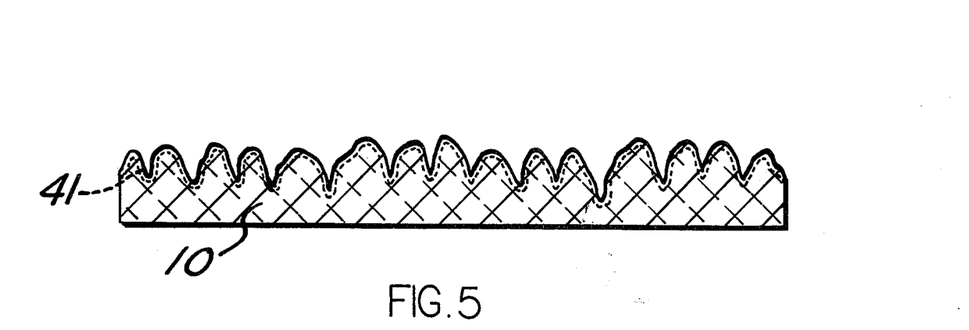
Figure 5A:
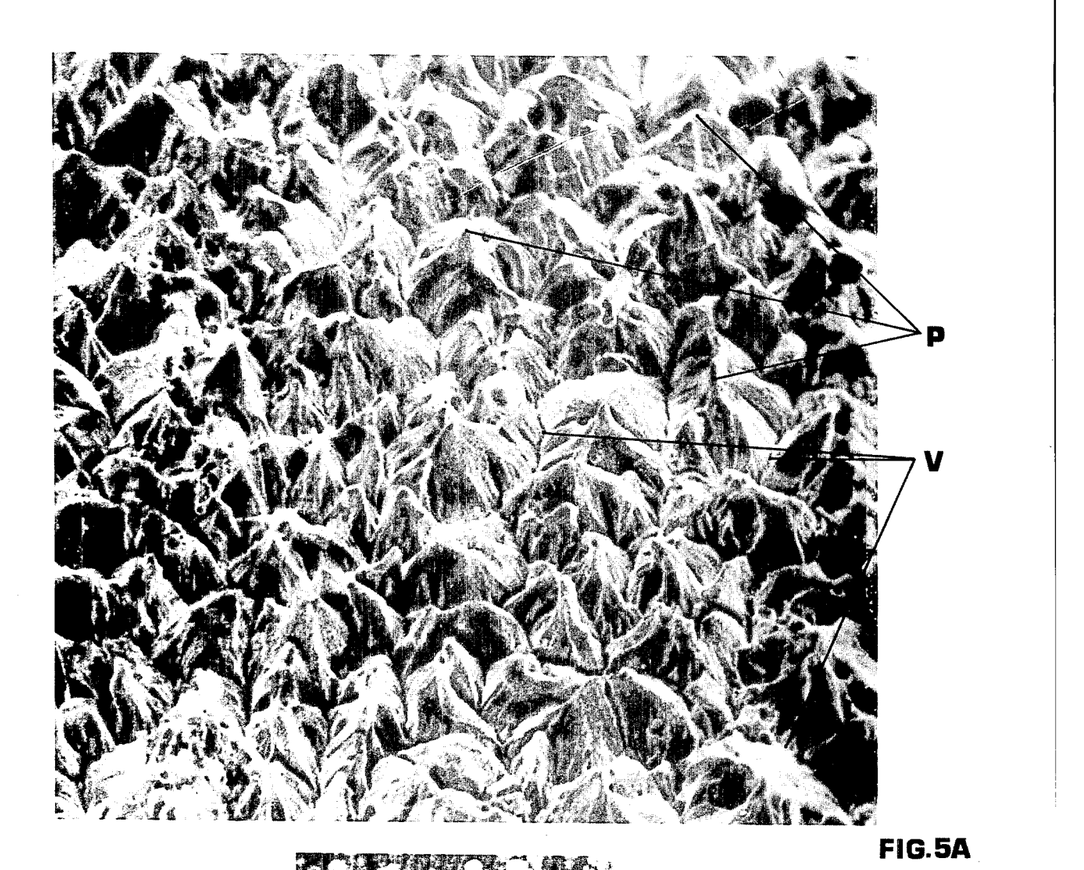
FIG. 5A is a microscopic photograp (500×) of a dyed oxide layer surface in accordance with the invention.

The entire piece may be immersed in a suitable dye bath for the required length of time. For purposes of black dyeing, a black dye bath which may be formed of either Nigrosine (pH 7.5-8.5 in tanks lined with PVC; pH 5.5-6.5 in unlined tanks) or Sandos MLW (pH 3.5-4.5) or their equivalent, at a temperature of approximately 150° F. is used. A concentration of 5 gms. per liter Nigrosine or 10 gms. per liter MLW is used. This piece 10 is held in the dye bath for approximately 15 minutes. The dyeing process increases the light absorbing efficiency in the visible range of the surface of the piece and minimizes the reflections therefrom, as will be described in more detail hereinbelow. After the dyeing step, the piece is rinsed in running tap water for not less than 3 minutes to remove excess dye. The dyed piece 10 is illustrated in FIG. 5 with the dye impregnating the surface thereof uniformly to a depth indicated by dotted line 41. As shown in FIG. 5A, (described in more detail below) the faults in the oxide layer provide good impregnation sites for the dye molecules.

After the piece has been dyed, the surface of the piece may be sealed as is conventional with anodized aluminum parts, and as indicated on the flow diagram by block 42. For purposes of sealing the surface, the piece is immersed in a tank of distilled water for approximately two minutes where the water temperature in the tank is approximately 190° F.

After the piece has been submerged for 2 minutes. it may be removed from the sealing tank and allowed to dry in the air.

FIG. 5A shows a photograph of 500 × enlargement of a finished oxide layer surface in accordance with the invention. The photograph is taken at an angle to the surface rather than as a plan view from directly above, in order to provide a perspective view which clearly shows the peaks P and valleys V of the surface. The roughened surface is seen to provide an efficient structure for trapping and absorbing radiation.

Figure 5B:
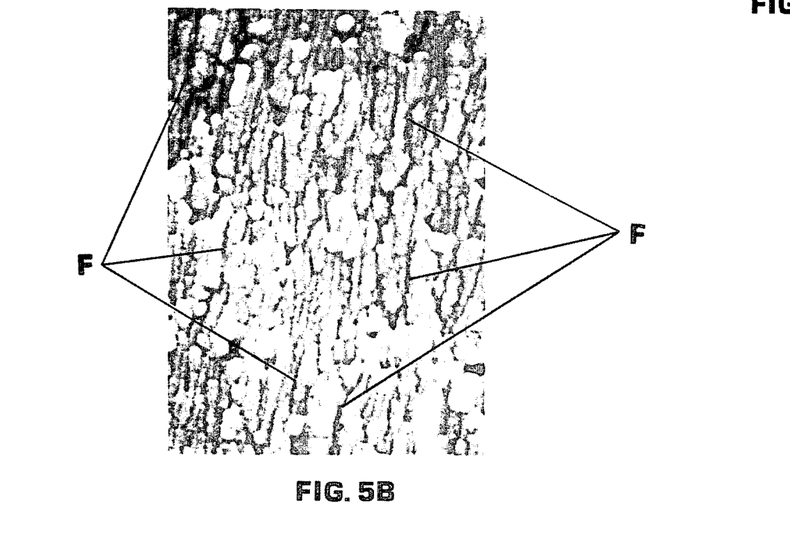
FIG. 5B is a scanning electron microscopic (35,000×) photograph of a vertical cross section of a dyed oxide layer prepared in accordance with the invention.

FIG. 5B shows a drawing made from a scanning electron microscope photograph of a cross section of the dyed oxide layer. The photograph is a 35,000 × enlargement. As can be seen from the drawing, the oxide layer has oriented itself into long columns defined by longitudinally extending faults F in the oxide layer. The faults extend in a generally mutually parallel direction within the oxide layer with cross-connections in the faults generally forming continuous path ways through the oxide layer. Generally, faults F are seen to extend throughout the entire oxide layer with the oxide being disposed in columns or columnar shaped nodules defined between the faults. As shown in FIG. 5B, the faults provide impregnation sites for the dye molecules, which are concentrated throughout the faults. The cross section of FIG. 5B is of such large magnification that it shows only a small segment of the oxide layer cross section. Consequently, it does not show the peak and valley configuration (apparent in FIG. 5A) which the oxide layer acquired by conforming to the honed metal surface as shown in FIG. 4. FIG. 5A is a cross section of a segment of a peak or other section of the oxide layer itself.

An oxide layer structure having generally parallel extending faults therethrough, as illustrated in FIG. 5A, is believed to be novel and heretofore unknown. The multiple faults extending through the oxide layer increases the total light absorbing area, and supplements the "light trapping" effect provided by the peak and valley gross construction of the oxide layer. The light absorption effect is also enhanced by the additional impregnation sites provided by the faults for dye absorption.

It has been found that vacuum drying of the sealed surface by heating it in a vacuum chamber and "back filling" the thus dryed surface with hydrogen fluoride enhances the optical properties of the surface. Specifically, reflectance peak values encountered at wavelengths at 1.3 microns and 5.8 microns can be eliminated by such treatment of the surface. While not wishing to be bound thereby, it is believed that the treatment drives water and other hydroxyl group containing compounds out of the oxide layer and the hydrogen fluoride reacts therewith to prevent subsequent re-entry or re-absorption of water or other hydroxyl group compounds into the oxide layer when the material is exposed to ambient conditions in use.

The vacuum drying and hydrogen fluoride treatment step may be carried out by placing the material containing the oxide layer (which may be dyed and sealed) into a vacuum chamber and imposing a vacuum thereon while heating the material to an elevated temperature. Under the combined action of the heat and the low pressure, water and other hydroxyl group compounds will, of course, "boil out" of the oxide layer and the aluminum surface, and are withdrawn from the chamber. The chamber is maintained under vacuum and back-filled with dry hydrogen fluoride gas and the dry hydrogen fluoride atmosphere is maintained thereover for a period of time. This concludes the treatment and the material may then be removed from the chamber and placed in use. The "intensity" of the hydrogen fluoride treatment is a factor of the pressure of the hydrogen fluoride over the oxide layer and the duration of contact.

Preferably, a vacuum showing a pressure of not substantially greater than about 1 millimeter of mercury (1 mm Hg), a temperature of at least 105° C. and a hydrogen fluoride back-fill to at least about 50 mm Hg pressure and a contact time of at least about 4½ hours is preferred. More preferably, a temperature of 105° to 110° C. is utilized.

Generally, the greater the vacuum imposed on the material in the vacuum chamber, i.e., the lower the pressure, the shorter is the required treatment time. Theoretically, a more nearly perfect vacuum, higher temperature, and higher pressure HF back-fill would enhance the treatment by reducing the treatment time. Further, a greater vacuum would lower the required temperature and vice-versa. However, a pressure of about 1 mm Hg is the lowest pressure which can be attained with roughing pump equipment and as a practical matter it is not economically worthwhile to utilize more sophisticated techniques such as diffusion pumps necessary to attain a lower pressure than the 1 mm Hg attainable with roughing pumps. Similarly, lower temperatures could be employed but this also lengthens the required treatment time. Higher temperatures could also be employed but some materials may be adversely affected by higher temperatures. Generally, combined conditions of vacuum and temperature sufficient to effectively remove substantially all water and other hydroxyl radical groups from the oxide layer is required, together with sufficient intensity of hydrogen fluoride treatment to stablize the oxide layer against water re-entry and hydroxyl group reaction. Reference in the claims to hydrogen fluoride treatment of an intensity sufficient to enhance the resistance of the oxide layer to "moisture re-absorption" or equivalent language is intended to mean such stabilization. The aforementioned specific preferred time, temperature, backfill pressure and vacuum conditions are not critical but are merely preferred as being effective and feasible from an engineering point of view.

In order to verify the stablizing effect of the hydrogen fluoride treatment, tests were conducted in which the vacuum drying step was carried out to remove water and other hydroxyl group compounds from the material but the hydrogen fluoride contacting step was omitted. An article so treated showed a weight loss after the vacuum heating step but upon back-filling of the chamber with ambient atmosphere the weight loss was recovered, indicating a re-entry of water and possibly other material into the oxide layer. A similar test carried out without the hydrogen fluoride treatment but substituting a dry nitrogen gas for the back-filled ambient atmosphere showed no recovery of the initial weight loss, indicating it is water primarily which re-enters the untreated (with HF) oxide layer. Materials treated with hydrogen fluoride in the above test show no recovery of the weight loss even upon prolonged exposure to ambient atmospheric conditions.

It is believed that the hydrogen fluoride reacts with the material in such a way as to preclude subsequent attraction or reaction with hydroxyl groups by the oxide layer.

It is important not to touch the prepared surface for any reason, as a smudge or fingerprint will affect the ability of the treated piece to provide uniform and effective radiation, including light, absorbency. After the piece is thoroughly dry, it is ready for use as an absorbent of light in any optical environment and/or as a decorative panel.

Figure 6:
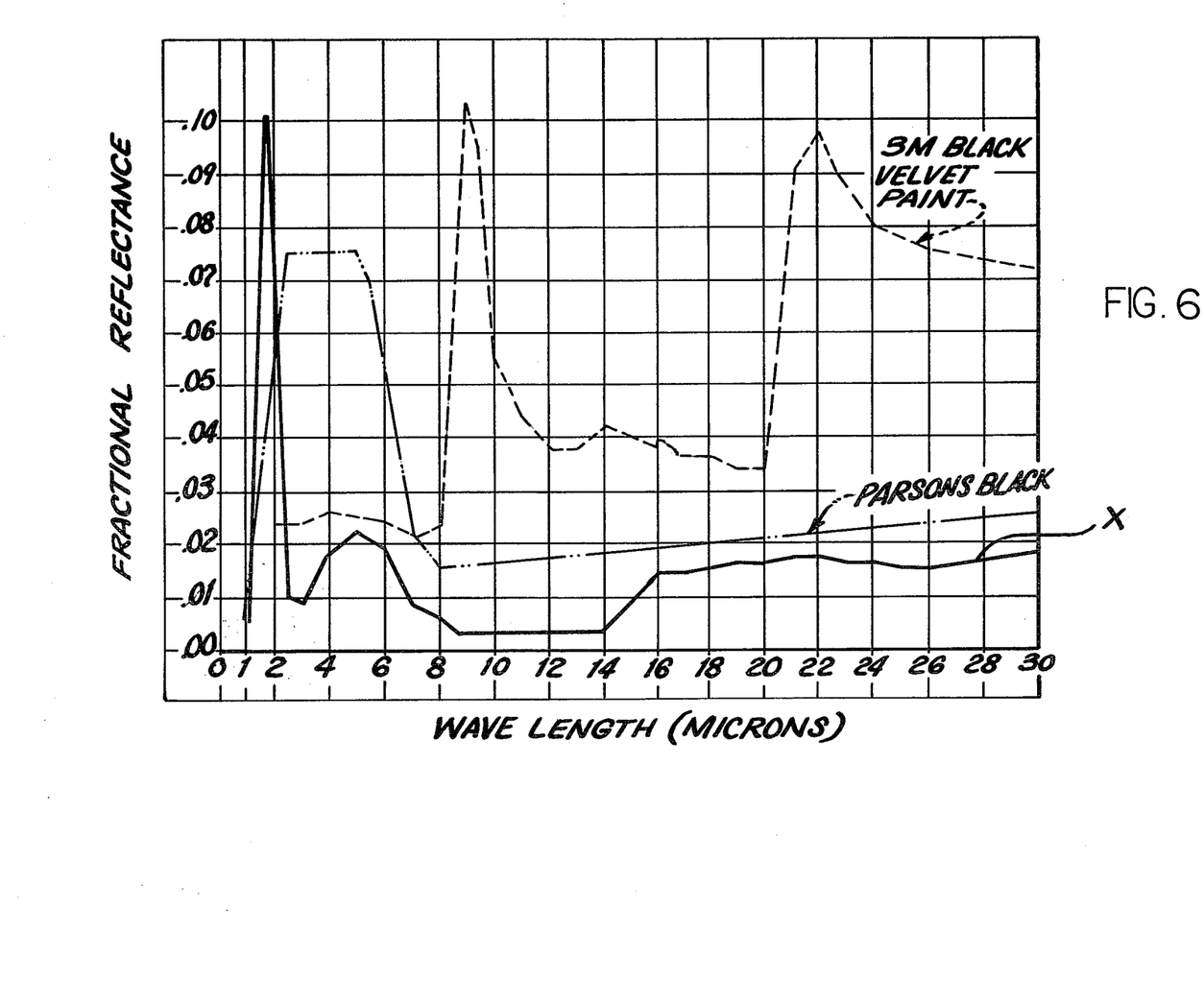
FIGS. 6 and 7 are charts showing comparative graphs of reflectance of 3M black velvet, Parson's black, and a representative layer formed in accordance with the present invention.

As a result of this process, the piece which is produced has an extremely high absorption capability for electromagnetic radiation in near ultra-violet, visible and infrared wavelengths, and as noted hereinabove the piece has a light-absorptive capability which is for many wavelengths superior to 3M black velvet paint, as well as Parson's black. The solid line curve designated X in the graph of FIG. 6 illustrates test results comparing the percentage of reflectance of light from a material in accordance with the invention prepared without the heat drying step and dyed black. The test data covers a wavelength range of up to 30 microns. (It is to be understood that the measured reflectance of different samples may vary somewhat from the solid line curve of FIG. 6 and that this curve represents the averaging of several tests.) It should be apparent from this graph that in the range of wavelengths between 6 microns and 30 microns the reflectance of surfaces in accordance with one aspect of the present invention, designated by the full line X on the graph, has a percentage of reflectivity of light which is less than two percent, i.e., a fractional reflectance as shown on the graph of less than 0.02 (2%). The test results indicate that the percent of reflectivity in those wavelengths is superior to both 3M paint (the dotted line illustration on the graph of FIG. 6) and Parson's black (the dot-dash illustration on the graph of FIG. 6). In fact, the graph shows that the surface provided by the present invention is a superior radiation absorbent for wavelengths of between 3 microns up to 30 microns, than either 3M paint or Parson's black. The surface of this embodiment is seen to have pronounced reflectance peaks at about 1.8 microns (over 10% reflectance) and at about 5 microns (about 2.5% reflectance). Reflectance values near these peaks exceed 2% from about 1.2 to 2.5 microns and from about 4.5 to 5.8 microns.

Figure 7:
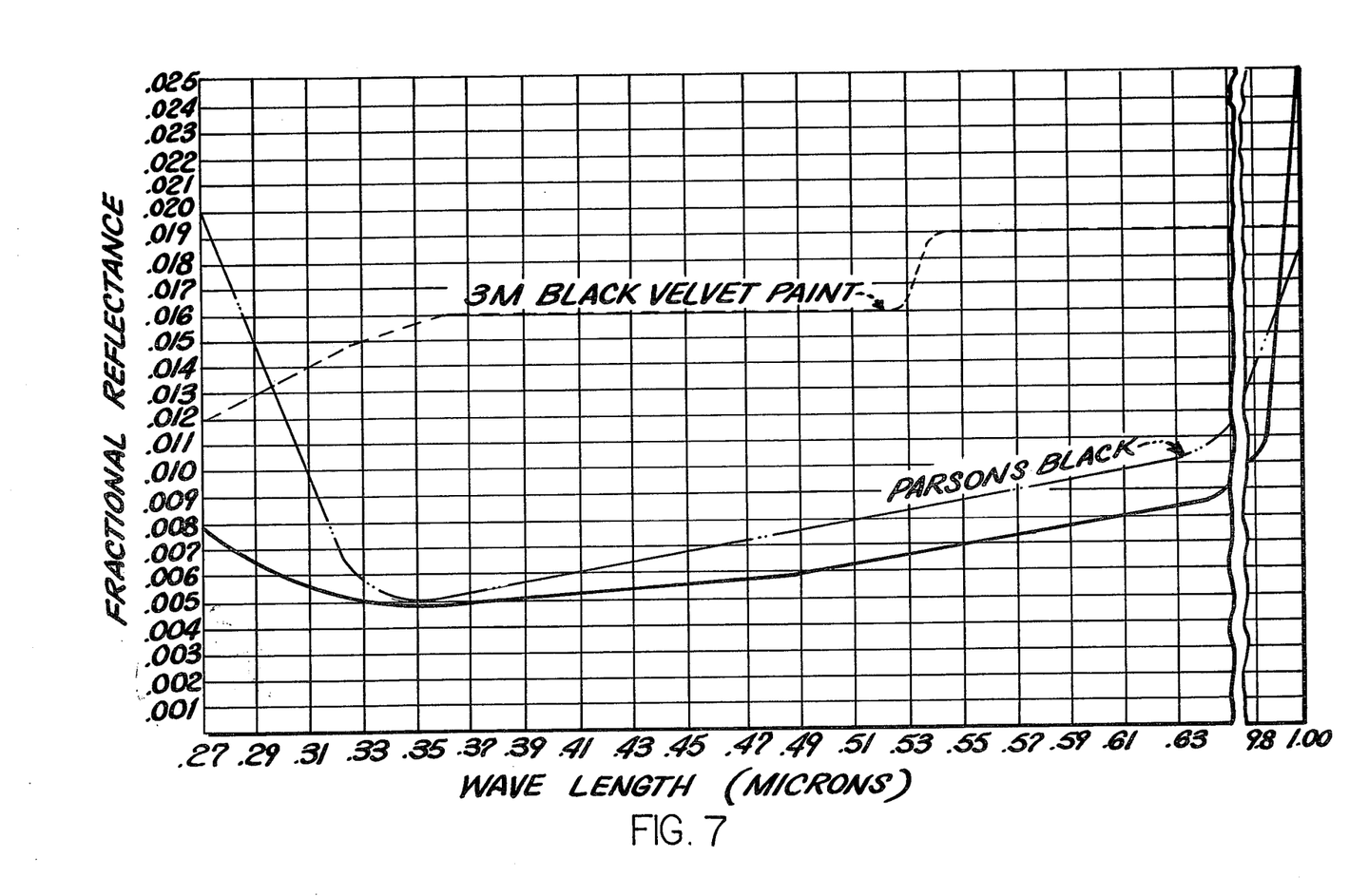

FIG. 7 is a graph illustrating test results in a lower range of wavelengths, i.e., 0.27 to 1.0 microns, which includes the visible range of about 0.35 to 0.70 microns. FIG. 7 graphically shows test results on a black dyed aluminum piece prepared in accordance with the invention (without the VDHF step) which indicate that in the visible range of wavelengths the radiation absorbency of the present invention is, again for a great percentage of the wavelength range, substantially greater than either 3M black velvet paint or Parson's black. For the visible range of wavelengths of from approximately 0.35 to 0.70 microns, the fractional reflectance is under 1% for this embodiment of the present invention.

Within the range of these graphs, it should be apparent that the only area where a non-VDHF step black dyed piece as disclosed herein is not superior to Parson's black and 3M black velvet paint is at wavelengths between approximately 1 to 2.5 microns, at which location a peak exists in the test result reflectance curve.

Figure 8:
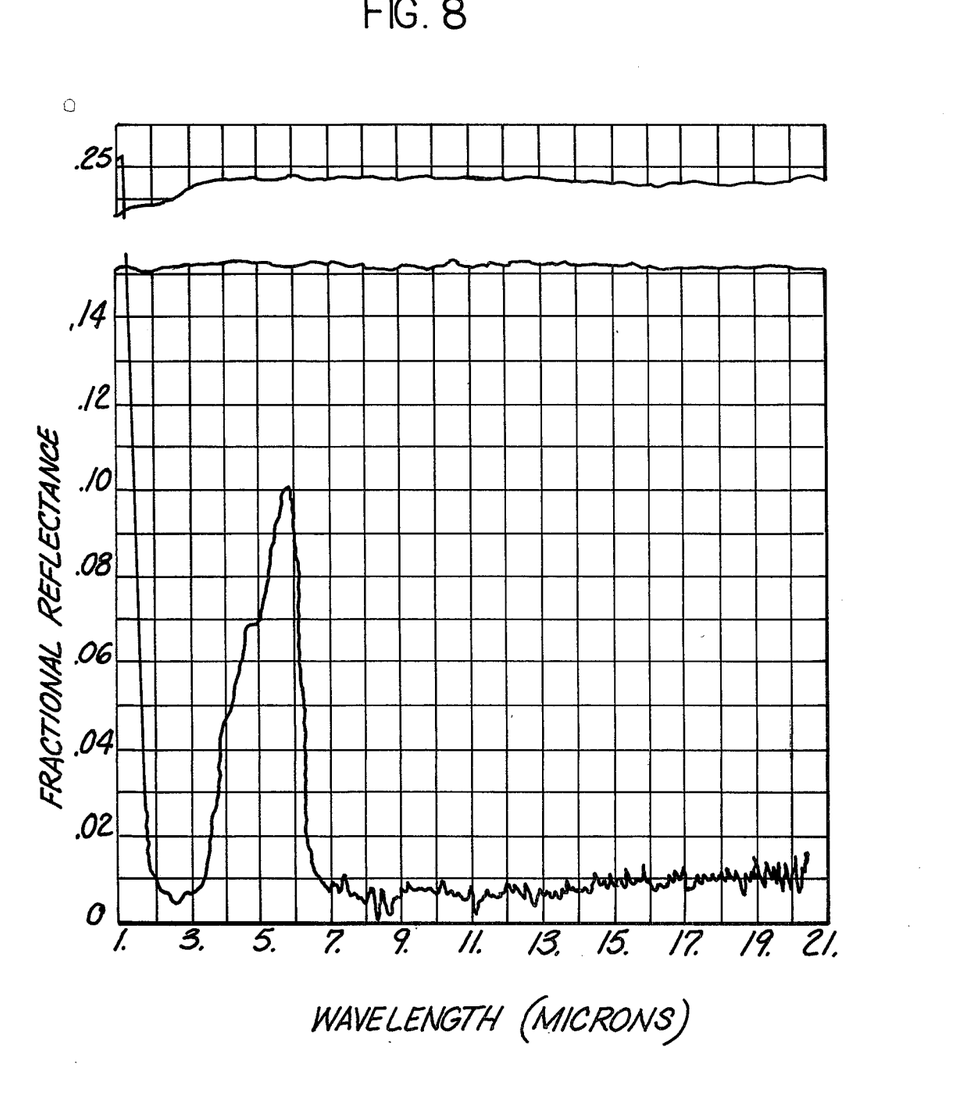
FIGS. 8 and 9 are charts showing comparative graphs of reflectance of a representative layer formed in accordance with the present invention, that of FIG. 8 of a layer formed without a vacuum-drying-hydrogen fluoride treatment and that of FIG. 9 of an otherwise identical layer formed in accordance with the invention but including the vacuum drying hydrogen fluoride treatment step.
Figure 9:
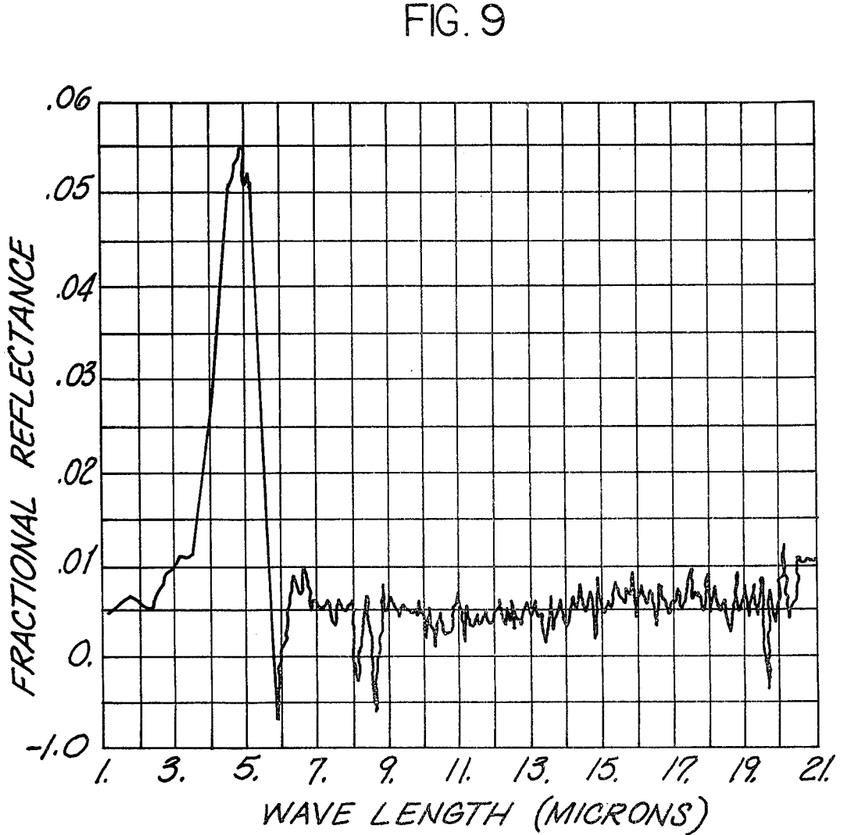

FIG. 8 is a graph illustrating test results of a black dyed surface prepared in accordance with the invention, without the vacuum dying and hydrogen fluoride treatment (VDHF) step schematically indicated by block 44 in FIG. 1. FIG. 9 is a similar graph for an otherwise identical surface prepared in accordance with the invention but including the VDHF step. The VDHF step for the tested material whose data is plotted in FIG. 9 was carried out as follows: Vacuum drying at a pressure of about 1 mm Hg and a temperature of about 105° to 110° C. until substantially all moisture is removed from the layer, i.e., until no further detectable water vapor occurs in the out-gas stream. Thereafter, back-filling with dry hydrogen fluoride gas to develop about 50 mm Hg pressure in the vacuum chamber and maintaining the hydrogen fluoride at that pressure and the 105° to 110° C. temperature for a period of about 4½ hours.

As FIG. 8 indicates, a large reflectance peak exists for this particular sample at about 1.3 microns. Another pronounced, less severe peak exists at about 5.8 microns and another intermediate peak at about 4.8 microns. As shown by the graph of FIG. 9, the VDHF step has entirely eliminated the reflectance peaks at 1.3 and 5.8 microns so that a reflectance of less than 2% is attained by the surface except in the vicinity of 4.7 microns where the peak (about 5.5% for this particular sample) persists. Accordingly, the only wavelength range at which a reflectance greater than 2% exists in the tested range of from 0.27 to 20 microns is at about 4.8 microns. In general, it will be noted from all the charts that the region around which the various reflectance peaks are centered are nowhere greater than 3 microns in width above 2% reflectance.

The reason for the low percentage of light and electromagnetic radiation in general reflected from a surface prepared in accordance with the present invention is believed to be as follows, although applicant does not intend to be bound thereby. The vapor honing and anodizing steps provide a roughened surface which has thereon a plurality of impressions or pits which have been referred to herein as "peaks and valleys". These peaks and valleys are formed in a random manner on the surface of the material as shown in FIG. 5A. The valleys are generally cone-shaped and of a size determined, at least in part, by the size of the grit particles. Due to the cone-shape, the cross-sectional area of the valleys diminishes as the valley enters deeper into the body of the metal; this helps to trap reflected radiation in the cones as described below. The oxide layer is deposited over the peaks and valleys and builds-up to a greater extent on the peaks than in the valleys. Thus, the height of the peaks relative to the valleys and so the effective depth of the conical valleys is increased by the anodized layer. Radiation which impinges on the prepared surface is reflected from the peaks into the valleys and the light or other radiation is "trapped" by being reflected a multitude of time within a cone by multiple reflections therein. The faults in the oxide layer (see FIG. 5B) provide further light and other radiation traps. In addition, the fact that the surface is dyed black increases the over-all efficiency of the surface to trap the light which impinges thereon. The large number of dye molecules which accumulate in the faults (as shown by FIG. 5B) enhances the trapping, particularly, of visible light. Further, obviously, each time the radiant energy impinges on a surface from one peak through a valley to another, a portion of that radiation energy is absorbed.

The existence of the faults and the resultant columnar structure of the oxide layer is demonstrated by a static charging test in which a pair of electrodes are placed on the anodized surface in accordance with the invention a distance apart from each other, and a voltage is applied thereacross. The static charge built-up on the oxide layer made in accordance with the invention bleeds off when a given voltage level, e.g., 200 volts, is attained because the current is conducted through the faults to the aluminum body. Conventional anodized oxide layer coatings of comparable thickness do not demonstrate this bleeding off of the static charge at the same voltage level, indicating that their oxide structure does not contain a multiplicity of faults since no paths through the electrically insulating oxide layer are provided.

As noted above, colored surfaces may be produced by the process. Such surfaces have a matte finish and may be dyed any color. The dyes employed may be popular types of commonly available color anodizing dyes well known to those skilled in the prior art. Yellow and gold surfaces provided have Knoop hardnesses numbers as high as 68.6 and 52.9, respectively, when they are dyed for immersion times not exceeding 10 minutes. Micro-hardness tests on the surfaces of product samples were performed with a Model MO Tukon machine manufactured by the Wilson Co. A Knopp indenter was used, under a 100 Gram load, the Knoop being an accurately ground diamond forming a rhombic base pyramid which produces an outline having a diagonal ratio of 7 to 1. Hardness readings were made with a microscope by reading the longitudinal angles in filar units and converting the data to hardness numbers.

Moreover, certain colored surfaces were shown to have light reflectance properties superior to the black surfaces for certain wavelengths. For example, red dyed surfaces prepared in accordance with this process absorb light better than do black surfaces in a portion of the spectrum. Between about 0.45 and 0.55 microns, the fractional reflectance of red surfaces is approximately 0.002. Since this is less than 0.044 for that region, it is better light absorption than that of black surfaces, as indicated by the graph of FIG. 7. Similarly, green dyed surfaces have a fractional reflectance less than 0.005 for most of a range of wavelengths between about 0.35 microns and 0.55 microns. Surfaces for which a blue dye was employed exhibit fractional reflectance values smaller than 0.005 for wavelengths between 0.52 and 0.65 microns.

Accordingly, red, green and blue dyed surfaces all have a fractional reflectance of less than 0.005 for wavelengths between 0.52 and 0.55 microns. The black dyed surface has a fractional reflectance of less than 0.007 for the same wavelengths, namely between 0.52 and 0.55 microns.

In addition, it was found that green and blue dyes, and to a lesser extent red dyes, produce an iridescent surface when the process of honing with aluminum oxide grit is performed only once and not, as with black, several times.

Figure 10:
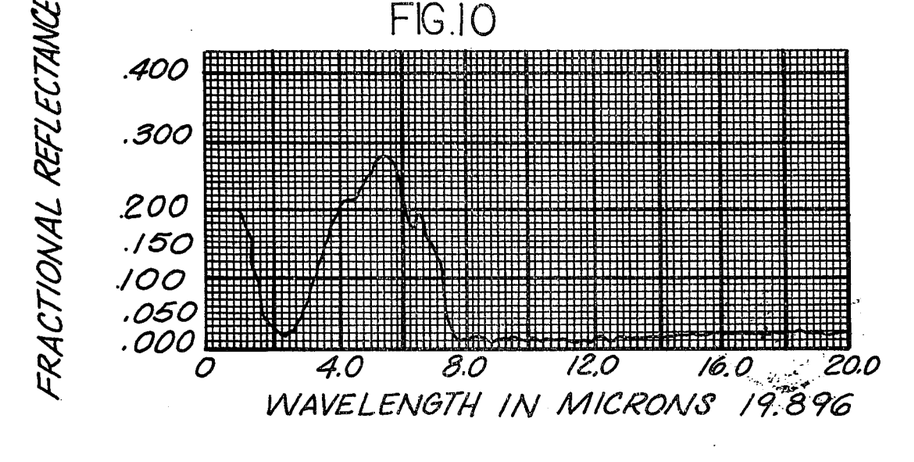
FIG. 10 is a chart showing reflectance of an undyed oxide layer in accordance with the invention for various wavelengths.

As hereinabove noted, an undyed surface in accordance with the invention has excellent capabilities for absorption of electromagnetic radiation in the infrared range. FIG. 10 is a chart plotting the fractional reflectance of an undyed surface formed in accordance with the invention over a wavelength range of about 1.2 to 20 microns. The surface tested was prepared in accordance with the invention. A grit-blasted aluminum body was anodized to form the oxide layer thereon, rinsed and dried. The dyeing and sealing steps were omitted. The undyed, unsealed oxide layer is then tested for absorption characteristic in the wavelength range up to 20 microns. As shown by FIG. 10, the fractional reflectance is initially rather high, about 0.180 (18%) at 1.2 microns wavelength. It drops off to less than about 3% at 2.3 microns but then increases to a peak value of over about 27% at about 5.6 microns. Thereafter, the reflectance drops until at about 7.78 microns the reflectance is less than 1%. The reflectance thereafter increases slightly but at up to about 14% is still below 1% reflectivity, and at up to about 20% is below 2% reflectivity.

The following table gives data for a particular sample made from an aluminum type 6061 alloy which was vapor honed with alumina grit particles of about 150 mesh size. In accordance with the invention, the surface was deoxidized, rinsed in cold water and then anodized in a sulfuric acid solution of a specific gravity of 1.12 at 19 volts at a temperature of about 89° F. for about 2 hours. After anodization, the surface was rinsed in cold water and dried. No dyeing or hot water sealing was employed. The sample was then tested for reflectivity with the results given below.

| Wavelength (Microns) | Fractional Reflectance | Wavelength (Microns) | Fractional Reflectance |
| --- | --- | --- | --- |
| 1.232 | .1817 | 10.111 | .0064 |
| 1.897 | .0243 | 10.492 | .0077 |
| 2.437 | .0122 | 11.146 | .0079 |
| 3.117 | .0492 | 11.495 | .0072 |
| 3.879 | .1714 | 11.968 | .0075 |
| 4.985 | .2343 | 12.552 | .0111 |
| 5.916 | .2692 | 12.989 | .0092 |
| 6.511 | .1744 | 13.591 | .0089 |
| 7.169 | .1401 | 14.056 | .0110 |
| 7.273 | .1232 | 14.506 | .0122 |
| 7.478 | .0597 | 15.422 | .0126 |
| 7.579 | .0286 | 16.039 | .0126 |
| 7.679 | .0144 | 16.537 | .0129 |
| 7.777 | .0074 | 16.973 | .0140 |
| 7.875 | .0080 | 17.492 | .0144 |
| 8.066 | .0043 | 18.043 | .0156 |
| 8.438 | .0057 | 19.012 | .0171 |
| 9.055 | .0042 | 19.184 | .0161 |
| 9.474 | .0063 | 19.354 | .0171 |
| 9.955 | .0083 | 19.647 | .0175 |

-continued

| Wavelength (Microns) | Fractional Reflectance | Wavelength (Microns) | Fractional Reflectance |
| --- | --- | --- | --- |
| | | 19.896 | .0194 |

As the above table shows, a very low level of reflectance in the region above 7.777 microns to at least 20 microns is provided by an undyed surface in accordance with the invention. The data given in the above table is taken from a more complete set of data from which the chart of FIG. 10 was plotted.

From the above, it should be apparent that the present invention provides a highly improved light-absorptive surface and which surface has a matte finish which not only is extremely decorative, but also, particularly when dyed black, capable of a high degree of radiation absorption well within the standards of 3M black velvet paint and Parson's black, and, in fact, for a majority of wavelengths is shown to be superior to both 3M black velvet paint and Parson's black as an absorbent of radiation, particularly when reflectance peaks in certain wavelength ranges are eliminated by water removal from the surface.

While the invention has been described in detail with respect to certain preferred embodiments, it will be clear that upon a reading and understanding of the foregoing, numerous alterations and modifications may be made thereto which are nonetheless within the spirit and scope of the invention. It is intended to include such alterations and modifications within the scope of the appended claims.

What is claimed is:

1. In a method of improving the absorbency of electro-magnetic radiation of an oxide layer produced on the surface of an anodizable metal selected from aluminum and aluminum alloys by sulfuric acid anodization at from about 80° F. to 100° F. and a voltage between about 12 to 25 volts for from 1.5 to 2.5 hours in a sulfuric acid solution having a specific gravity of from 1.10 to 1.13 measured at 70° F. the improvement which comprises heating said layer under a pressure no greater than about 1 mm Hg. at a temperature of at least 105° C. to remove moisture therefrom, and contacting said surface with hydrogen fluoride gas in an amount sufficient to raise the pressure to at least about 50 mm. Hg. for a period of time sufficient to render said layer resistant to re-absorption of moisture.

2. The method of claim 1 wherein said oxide layer is produced by anodization of an aluminum body in a sulfuric acid solution of specific gravity of between about 1.102 to 1.128 measured at 70° F., at a temperature of between about 80° to 100° F. for a period of from about 1¾ to about 2¼ hours at a voltage between about 12 to 25 volts.

3. A method of making a product having a surface of extremely low reflectance of electromagnetic radiation for the majority of wavelengths including the near ultra-violet, visible and infra red ranges up to at least about 20 microns comprising the steps of honing an aluminum metal body by impacting therein a slurry of grit particles in water by means of air pressure, said grit particles being of a size not more than 100 mesh, anodizing the honed surface in a sulfuric acid solution having a specific gravity of between about 1.10 to 1.13 measured at 70° F., said anodization step being carried out at a sulfuric acid solution temperature of between about 80° to 100° F. with an applied voltage of between about 12 to 25 volts for a period of time from between about 1¾ to 2¼ hours to form an oxide layer on the surface, dyeing the surface, sealing the dyed surface with hot water at a temperature between about 180° F. and 200° F., heating the surface to an elevated temperature under vacuum to remove water from said oxide layer, and maintaining the surface under vacuum while contacting it with hydrogen fluoride for a period of time sufficient to render said oxide layer resistant to re-absorption of moisture.

4. The method of claim 3 wherein said period of time is at least about 4 hours, said vacuum is a pressure of not less than about 1 mm Hg. and said elevated temperature is at least about 105° C., and said hydrogen fluoride is maintained at a pressure of at least about 50 mm Hg. over said oxide layer.

5. A method of making a product having a surface of extremely low reflectance of electromagnetic radiation including the near ultra-violet, visible and infra red ranges comprising the steps of honing an anodizable aluminum metal body by impacting thereon a slurry of grit particles in water to form a plurality of peaks and valleys on the surface of said metal body, the grit particles being of a size between 100 to 200 mesh and the slurry being impacted against the metal by compressed air at a pressure of between 80 to 150 pounds per square inch, anodizing said surface in a sulfuric acid solution having a specific gravity of between about 1.10 to 1.13 measured at 70° F., at a temperature of between about 80° to 100° F. with an applied voltage of between about 12 to 25 volts, and conducting said anodization for a period of from between about 1½ to 2¼ hours, dyeing the oxide layer and sealing it in hot water at a temperature not greater than 200° F., and heating said oxide layer to an elevated temperature under vacuum to remove water therefrom, and contacting said oxide layer with hydrogen fluoride while maintaining it under vacuum.

6. The method of claim 5 wherein said vacuum under which said oxide layer is heated is a pressure not less than about 1 mm Hg. and said elevated temperature is not less than about 105° C.

7. The method of claim 6 wherein said contacting with hydrogen fluoride is carried out for at least about 4½ hours.

8. The method of claim 7 wherein said elevated temperature is between about 105° to 110° C.

9. A method of making a product having a surface of extremely low reflectance of electromagnetic radiation in wavelengths ranging from 0.27 to about 30 microns which comprises the steps of providing a workpiece of aluminum, honing the surface of the aluminum workpiece with alumina grit particles having a particle size between 100 and 200 mesh dispersed in water and directed at the aluminum workpiece under pressure; etching the surface with a caustic etch solution and rinsing the surface; anodizing the etched rinsed surface in an aqueous sulfuric acid solution having a specific gravity of between about 1.10 and 1.13 measured at 70° F., at a temperature of between about 80° F. to 100° F. and a voltage between about 12 to 25 volts and carrying out said anodization for a period of between about 1¾ to 2¼ hours, rinsing the surface, said anodized surface being characterized by a columnar structure defined by faults extending longitudinally therein, dyeing the surface in an organic black dye bath, rinsing the workpiece after dyeing to remove excess dye, and then sealing the surface with hot, distilled water, said product being further characterized in that it has a fractional reflectance of under 2 percent for the majority of wavelengths in the range of 0.27 to 30 microns.

10. A method of making a product having a surface of extremely low reflectance of electromagnetic radiation in wavelengths ranging from 0.27 to about 30 microns which comprises the steps of providing a work piece of aluminum, vapor honing the surface with alumina grit particles having a particle size between 100 and 200 mesh dispersed in water projected against the surface of the aluminum work piece with compressed air at a pressure between 80 and 150 pounds per square inch, etching the surface with a caustic etch solution and rinsing the surface, and anodizing the etched rinsed surface in an aqueous carbon dioxide saturated sulfuric acid solution having a specific gravity of between about 1.10 and 1.13 measured at 70° F., at a temperature of between about 80° F. and 100° F. with an applied voltage of between about 12 to 25 volts and carrying out said anodization for a period of between about 1¾ to 2¼ hours and rinsing the surface, said anodized surface being characterized by a columnar structure defined by faults extending longitudinally therein, dyeing the surface in an organic black dye bath, rinsing the work piece after dyeing to remove excess dye, and then sealing the surface with not distilled water, said product being further characterized in that it has a fractional reflectance of under 2 percent for the majority of wavelengths in the range of 0.27 to 30 microns.

11. The process of claim 10 in which the anodized surface is dyed black with nigrosine black dye.

12. A product having a surface of enhanced nonreflectance of electromagnetic radiation at wavelengths up to 30 microns comprising a body made of an anodizable metal and having an anodized surface defined by a plurality of peaks and valleys having an oxide layer formed thereon by anodization, said oxide layer having been reacted with hydrogen fluoride.

13. The product of claim 12 wherein the oxide layer is a dyed and sealed layer.

14. The product of claim 13 wherein the oxide layer is dyed black.

15. A product having a surface of extremely low reflectance of electromagnetic radiation at wavelengths up to 30 microns comprising a body made of an anodizable metal selected from aluminum and aluminum alloys and having a black anodized surface defined by a plurality of peaks and valleys having an oxide layer formed thereon by sulfuric acid anodization at from about 80° F. to 100° F. and a voltage between about 12 to 25 volts for from 1.5 to 2.5 hours in a sulfuric acid solution having a specific gravity of from 1.10 to 1.13 measured at 70° F. and dyed black, said anodized surface having a fractional reflectance of under 2% for majority of wavelengths up to 30 microns, and said oxide layer is a vacuum dryed, hydrogen fluoride-treated oxide layer of enhanced resistance to absorption of moisture.

16. The product of claim 15 wherein said fractional reflectance is less than 2% for all wavelength regions up to 30 microns except for a reflectance peak occuring in a region centered at about 4.8 microns.

17. The product of claim 15 wherein said anodizable metal is aluminum.

18. The product of claim 15 wherein said oxide layer has a columnar structure defined by faults extending therein.

19. The product of claim 18 wherein the metal is aluminum and the oxide layer is one which is formed by anodization in a sulfuric acid solution of a specific gravity of between about 1.10 to 1.13 measured at 70° F., at a temperature of between about 80° to 100° F. for a period of 1½ to 2½ hours at a voltage of between about 12 to 25 volts, and wherein the oxide layer is dyed and sealed in hot water at a temperature from about 180° F. to 200° F.

20. The product of claim 18 wherein the oxide layer is dyed and sealed in hot water at a temperature from about 180° F to 200° F.

21. The product of claim 20 wherein said oxide layer has an enhanced resistance to moisture reabsorption due to being vacuum dried and treated under vacuum and hydrogen fluoride.

22. The product of claim 15 in which the anodized surface is dyed black with nigrosine black dye.

* * * * *